United States Patent
Forster

(10) Patent No.: US 9,111,191 B2
(45) Date of Patent: Aug. 18, 2015

(54) METHOD OF MAKING RFID DEVICES

(75) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 1148 days.

(21) Appl. No.: 12/277,697

(22) Filed: Nov. 25, 2008

(65) Prior Publication Data

US 2010/0126000 A1    May 27, 2010

(51) Int. Cl.
*H01P 11/00* (2006.01)
*G06K 19/077* (2006.01)

(52) U.S. Cl.
CPC .... *G06K 19/07749* (2013.01); *G06K 19/07718* (2013.01)

(58) Field of Classification Search
CPC .......... H01P 11/003; G06K 19/07749; G06K 19/07752; G06K 19/07783; G06K 19/0776; H05K 3/00; H05K 3/205
USPC ............... 29/600–601, 592.1, 832, 846–847; 343/700 MS, 879, 906; 361/748, 361/760–767; 340/572.2–572.8, 691.6
See application file for complete search history.

(56) References Cited

U.S. PATENT DOCUMENTS

| | | | | |
|---|---|---|---|---|
| 4,900,386 A | * | 2/1990 | Richter-Jorgensen | ........ 156/250 |
| 5,055,968 A | * | 10/1991 | Nishi et al. | ..................... 361/737 |
| 5,829,121 A | * | 11/1998 | Shoemaker et al. | ............ 29/600 |
| 6,018,299 A | * | 1/2000 | Eberhardt | ................... 340/572.7 |
| 6,140,966 A | * | 10/2000 | Pankinaho | ............. 343/700 MS |
| 6,483,473 B1 | * | 11/2002 | King et al. | ...................... 343/767 |
| 6,535,175 B2 | | 3/2003 | Brady et al. | |
| 7,202,790 B2 | | 4/2007 | Copeland et al. | |
| 7,477,151 B2 | | 1/2009 | Forster et al. | |
| 7,839,338 B2 | * | 11/2010 | Hockey et al. | ............. 340/572.3 |
| 2007/0074384 A1 | | 4/2007 | Forster et al. | |
| 2008/0168647 A1 | | 7/2008 | Forster et al. | |

FOREIGN PATENT DOCUMENTS

WO    WO9967754 A1    12/1999

* cited by examiner

*Primary Examiner* — Minh Trinh
(74) *Attorney, Agent, or Firm* — Avery Dennison Corporation

(57) ABSTRACT

A method of producing antennas for RFID devices includes cutting or otherwise physically separating the antennas from a preformed sheet of conductive material that includes apertures in the conductive material. Cutting locations relative to the apertures may be selected based on desired performance characteristics of the antenna and/or of the RFID device for which the antenna is to be used. The cutting locations may include one or more cuts through the aperture, and other cuts that do not pass through an aperture. The cutting locations may be selected as a function of such parameters as the desired bandwidth of the antenna and the operating frequency of the antenna. The method allows production of antennas with different characteristics, from a previously-prepared supply of sheet conductive material. This facilitates the ability to make small production runs of antennas, and/or to reduce the lead time for providing antennas with specified characteristics.

19 Claims, 9 Drawing Sheets

METHOD OF MAKING RFID DEVICES

BACKGROUND OF THE INVENTION

1. Field of the Invention

The invention is in the field of radio frequency identification (RFID) devices, and methods for making such devices.

2. Description of the Related Art

Radio frequency identification (RFID) tags and labels (collectively referred to herein as "devices") are widely used to associate an object with an identification code or other information. RFID devices generally have a combination of antennas and analog and/or digital electronics, which may include for example communications electronics, data memory, and control logic. For example, RFID tags are used in conjunction with security locks in cars, for access control to buildings, and for tracking inventory and parcels.

As noted above, RFID devices are generally categorized as labels or tags. RFID labels are RFID devices that are adhesively or otherwise have a surface attached directly to objects. RFID tags are secured to objects by other means, for example by use of a plastic fastener, string, or other fastening means.

RFID devices include active tags and labels, which include a power source, and passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID devices can retain and transmit enough information to uniquely identify individuals, packages, inventory and the like. RFID tags and labels also can be characterized as to those to which information is written only once (although the information may be read repeatedly), and those to which information may be written during use. For example, RFID devices may store environmental data (that may be detected by an associated sensor), logistical histories, state data, etc.

Often RFID products are configured in relatively uniform designs for use in large-scale applications, such as may be found in large retailing situations. These designs, once proven and implemented may take weeks or even months to produce. Such designs however, often will not function in small to mid level applications for which RFID products may be useful. However, due to the small unit volumes, often less than 50,000 units, many of the suppliers of RFID products are simply unwilling, largely because of cost, to undertake the design and development of specialized tags for these niche applications.

In addition, different RFID devices may have to perform to different performance requirements, and/or to perform in different operating environments. There is a need to provide RFID devices that are able to meet various requirements and to perform in various conditions. It will be appreciated that satisfying that need would be desirable.

SUMMARY OF THE INVENTION

According to an aspect of the invention, a conductive material sheet has a series of apertures therein. Separation locations are selected relative to the apertures to allow antennas to be physically separated from the sheet material with any of a variety of properties, to achieve antennas with desired characteristics.

According to another aspect of the invention, a method of making a radio frequency identification (RFID) device includes the steps of: providing a monolithic continuous conductive sheet material having apertures therein; after the providing, receiving one or more characteristics relating to performance of an antenna for the RFID device; and selecting separating locations relative to one of the apertures for separating the conductive material sheet to form the antenna, wherein the selecting is based on the one or more characteristics relating to performance.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A method of producing antennas for RFID devices includes cutting or otherwise physically separating the antennas from a preformed sheet of conductive material that includes apertures in the conductive material. Cutting locations relative to the apertures may be selected based on desired performance characteristics of the antenna and/or of the RFID device for which the antenna is to be used. The apertures may be T-shape apertures that have an extent in one direction that is greater than the extent in the other direction. The cutting locations may include one or more cuts through the aperture, and other cuts that do not pass through an aperture. The cutting locations may be selected as a function of such parameters as the desired bandwidth of the antenna and the operating frequency of the antenna. The method allows production of antennas with different characteristics, from a previously-prepared supply of sheet conductive material, such as a roll of conductive material with the apertures. This facilitates the ability to make small production runs of antennas, and/or to reduce the lead time for providing antennas with specified characteristics.

Figure 1:
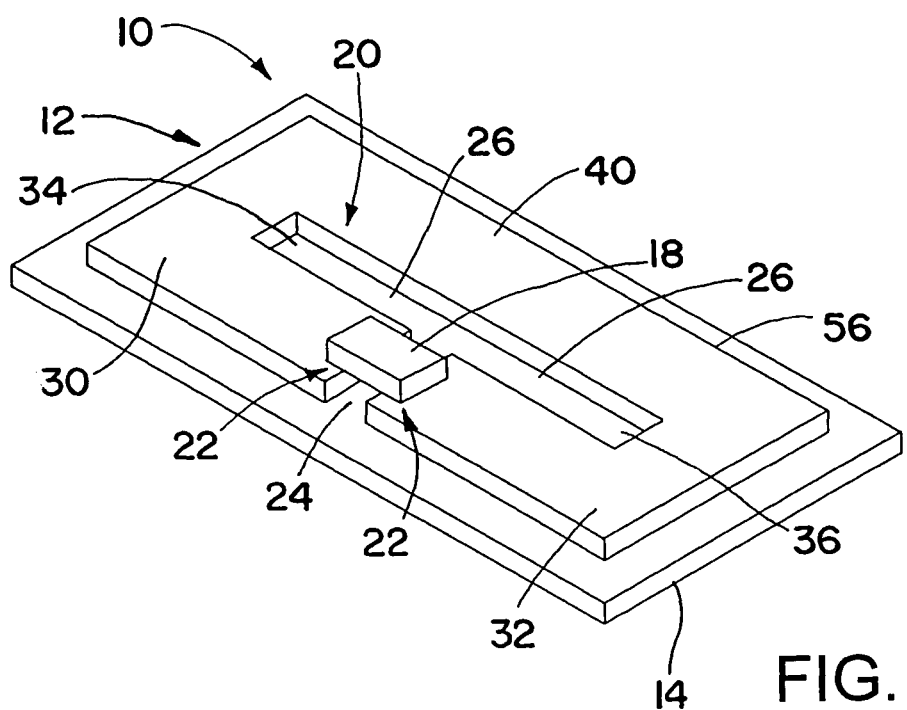
FIG. 1 is an oblique view of an RFID device formed by a method according to an embodiment of the invention.

FIG. 1 shows an RFID device 10 that has an antenna 12 that may be produced using the method described below. The RFID device 10 also has a substrate 14 upon which the antenna 12 is mounted. A chip 18 is coupled to the antenna 12 to enable detection of the RFID device and/or communication of the RFID device with external readers/detectors.

The RFID chip 18 includes an integrated circuit, memory devices, and other suitable structures for controlling and/or regulating communication with external devices (such as readers and/or detectors), through sending and/or receiving signals through the antenna 12. Functions of the chip 18 are carried out by circuitry of the chip, using a variety of well-known electronic structures. The chip 18 may be directly connected to the antenna 12, or may alternatively be coupled to the antenna 12 using an intervening structure such as an interposer or strap. Such an interposer or strap may have conductive leads that facilitate electrical connection between the chip 18 and the antenna 12. Such electrical connection may be a direct contact electrical connection, characterized by a low electrical resistance, or alternatively a reactive electrical connection, where the electrical connection is via an electric field, a magnetic field, or a combination of such fields.

The antenna 12 in the illustrated embodiment is a dipole antenna with a T-shape aperture 20. The chip 18 is at feedpoints 22 across a stem 24 of the T-shape aperture 20. A crossbar 26 of the T-shape aperture 20 forms a slot separating parts of the antenna 12. The crossbar 26 may have a greater extent (length) than the extent (length) of the stem 24. Conductive material surrounds crossbar 26 of the aperture 20 on all sides, with the exception of the stem 24. The conductive material includes a pair of arms 30 and 32 that attach to and extend from respective ports of the chip 18. The arms 30 and 32 extend around ends 34 and 36 of the aperture crossbar 26, and come together in a shunt inductor 40 of conductive material across the top of the crossbar 26, attaching together the arms 30 and 32. The shunt inductor 40 is on an opposite side of the aperture 20 from the chip 18. The arms 30 and 32 constitute the antenna elements of the dipole antenna 12. The shunt inductor 40, which is connected at the effective tap points at which the inductor 40 to the rest of the dipole antenna 12, transforms the chip impedance. The combination of this with the length and width of the antenna 12 controls its frequency and characteristics on materials.

The substrate 14 may be a flexible substrate using any of a variety of suitable substrate materials, for instance including plastic (polymers), paper, or cardboard. The flexible material substrate may be part of a roll or sheet of substrate material. Alternatively the substrate 14 may be made of a rigid material.

It will appreciated that the RFID device 10 may include additional layers, such as protective layers, printable layers, layers with graphics or other visual material on them, adhesive layers, and/or layers that provide structural properties. The RFID device 10 may be formed in one or more roll-to-roll processes, and then physically separated (singulated) from the sheet or roll.

Figure 2:
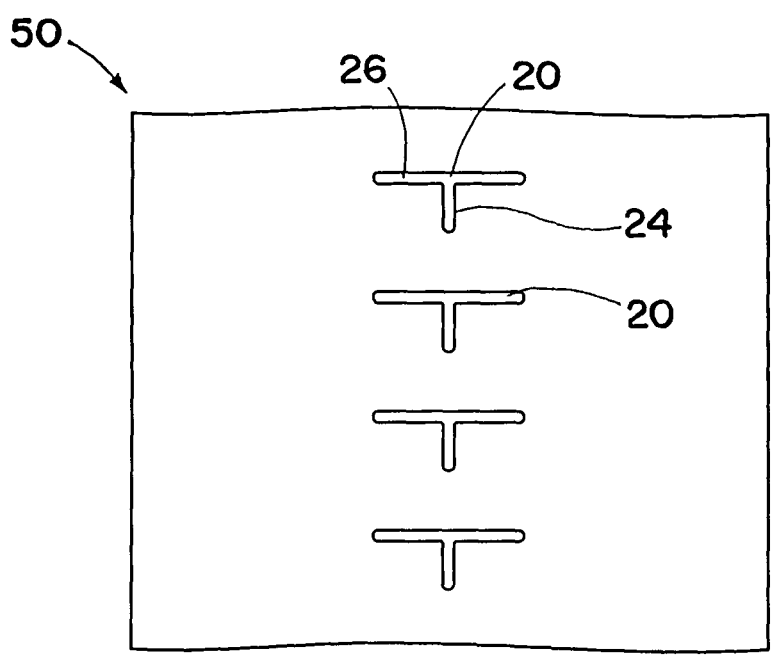
FIG. 2 is a plan view of a conductive material sheet used for producing antennas for RFID devices such as that of FIG. 1.

In order to facilitate production of the antenna 12 for the RFID device 10, it is useful to form multiple of the antennas 12 from a pre-formed conductive material sheet or roll 50, shown in FIG. 2. The conductive material sheet 50 is a unitary, monolithic, continuous conductive material sheet, having a series of apertures 20 in it. The conductive material 50 may be planar, and may be in sheet, web, or roll form. The apertures 20 each have a greater extent in a cross-sheet direction (parallel to the crossbars 26) than in a down-sheet direction (parallel to the stems 24). The antennas 12 are cut, slit, or otherwise physically separated from the conductive material sheet 50, with the cutting (or slitting or separating) locations selected to provide suitable characteristics for the antenna 12. This enables properties of the antenna 12 to be tailored to a desired performance of the antenna 12, and/or to allow the antenna 12 to function well in an environment where the RFID device 10 is used.

Figure 3:
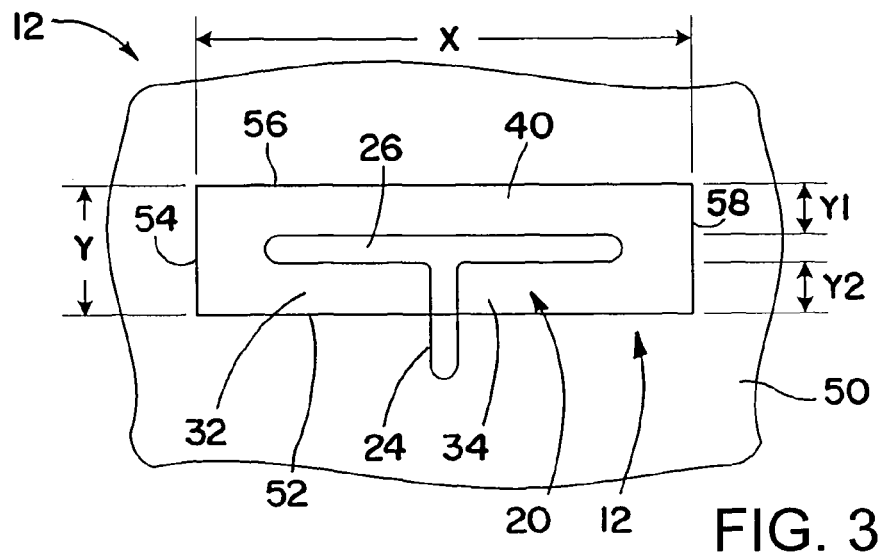
FIG. 3 is a plan view showing separation locations to produce an antenna from the conductive material sheet of FIG. 2.

Referring now in addition to FIG. 3, the antenna 12 boundaries are defined by several cutting locations 52-58 (separating locations) used to physically separate the antenna 12 from the rest of the conductive material sheet 50. One of the cutting locations, the cutting location 52 in the illustrated embodiment, may pass through the aperture 20. The cutting location 52 may pass through the stem 24 of the aperture 20, separating the conductive material of the arms 30 and 32 to which the RFID chip 18 (FIG. 1) is coupled. The other cutting locations 54, 56, and 58 do not pass through any part of the aperture 20.

The dimensions of the antenna 12, defined by the cutting locations 52-58, may be characterized in several ways. A length X of the antenna 12 and a width Y of the antenna 12 indicate the overall size of the antenna 12. The length X of the antenna 12 is the distance between the cutting locations 54 and 58, and the width Y is the distance between the cutting locations 52 and 56. The length X has a strong effect on the operating frequency of the antenna 12, the frequency at which the antenna 12 most preferentially receives incoming energy. In general terms, reducing length of the antenna section will increase operating frequency of the antenna 12. However the effect on characteristics may be affected by an interdepence with the transformer network. The width Y affects the bandwidth of the antenna 12, the range of frequencies over which the antenna 12 can effectively communication.

Other dimensions of the antenna 12 may affect other operating characteristics of the antenna 12. The width Y1 of the shunt inductor 40 may be controlled to alter the impedance matching between the antenna 12 and the RFID chip 18 (FIG. 1). The shunt inductor width Y1 can be reduced to increase the inductance of the antenna 12, and can be increased to reduce the inductance of the antenna 12. The shunt inductor width Y1 can be altered by moving the cutting locations 52 and 56 as a unit, maintaining the overall antenna width Y and changing a width Y2 of the arms 30 and 32. (It will be appreciated that the overall antenna width Y is the sum of the shunt inductor width Y1, the width of the crossbar 26 of the aperture 20, and the arm width Y2.) Alternatively the shunt inductor width Y1 may be changed independently by moving only the cutting location 56 relative to the aperture 20.

Figure 4A:
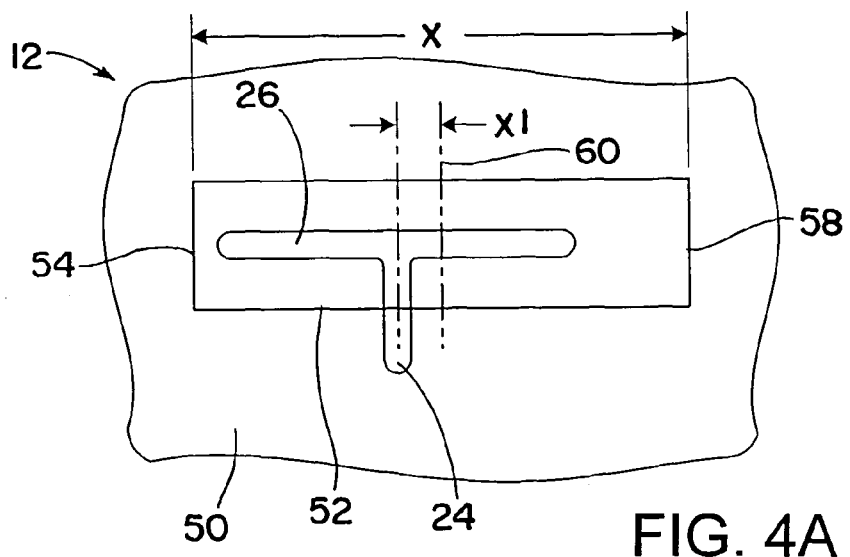
FIG. 4A is a plan view of another configuration of separation locations to produce an antenna with different characteristics, from the conductive material sheet of FIG. 2.

The antenna length X may be centered symmetrically about the aperture 20, with the aperture stem 24 substantially centered between the cutting locations 54 and 58. This configuration is illustrated in FIG. 3. Alternatively, as shown in FIG. 4A, the cutting locations 54 and 58 may be located such that the aperture stem 24 is offset a distance X1 from a line 60 halfway between the cutting locations 54 and 58. Having cutting locations 54 and 58 not symmetrically located about the aperture 20 may increase the radiation resistance of the RFID device 10. This may facilitate better impedance matching between the antenna 12 and the RFID chip 18. For a dipole antenna, radiation resistance increases as offset distance increases. For example, for a dipole antenna that has 70 ohms resistive for a half wave device at the center, the resistance increases as the feed points are moved off center. The resistance seen is effectively the ratio of the current and voltage at a point. The ends of a dipole type antenna are high voltage points, and hence low current. The resistance, V/I (voltage/current), is large, so as one moves toward the ends the resistive part increases.

Figure 4B:
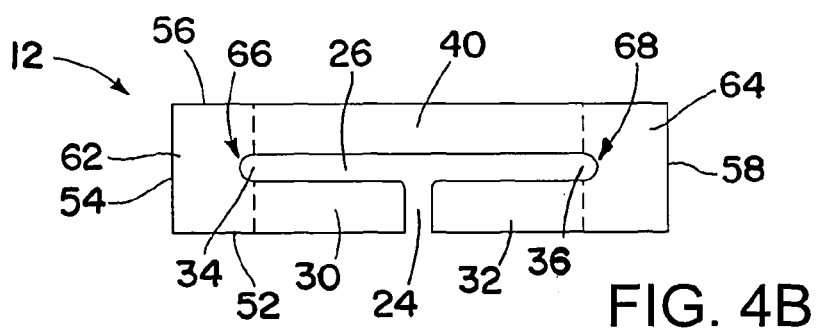
FIG. 4B is a plan view showing parts of an antenna produced from the conductive material sheet of FIG. 2.

With reference now to FIG. 4B, the antenna elements of the dipole antenna 12 constitute the arms 30 and 32. The arms 30 and 32 are on an opposite side of the slot 26 from the shunt inductor 40. The rectangular antenna portions 62 and 64 extending around the ends 34 and 36 of the slot 26 electrically connect the arms 30 and 32 to opposite sides of the shunt inductor 40. The connection between the arms 30 and 32, and the shunt inductor 40, is distributed throughout the rectangular portions 62 and 64. However the connection may be treated as at a pair of tap points 66 and 68 on opposite ends of the slot 26. The effective position of the tap points 66 and 68 is determined by the ratio of the proportion of the inductance in the arms 30 and 32 to the inductance of shunt inductor 40. This in turn depends on the horizontal slot length of the slot 26 and the relative width of the shunt inductor 40 and the dipole antenna elements arms 30 and 32. Varying the width of the shunt inductor 40 and the arms 30 and 32 affects the total inductance of antenna 12. Varying the ratio of the two widths, that of the shunt inductor 40 and that of the two arms 30 and 32, affects the tap point locations 66 and 68, and impedance transformation achieved by the antenna 12. The total length and width of the antenna 12 also affects the antenna portion impedance. However it will be understood that some of these variable are inter-dependant.

The impedances of a standard dipole type antenna (e.g., 70 ohms resistive for a full half wave) and of an RFID chip (e.g., about 1800 ohms resistive plus a capacitive reactance in the range of 1 pF) are very different. The antenna and the chip would have a high relative mismatch if they were just directly connected together. The large mismatch in characteristics would mean that the power transfer between the antenna and the chip would be poor. In most dipole-type RFID devices a form of transformer is used to improve the match between chip and antenna. More specifically, the configuration can be described as a tapped auto-transformer, consisting of an inductor in parallel with the RFID chip and two tap points taken from the inductor to connect to the antenna. However, in the antenna 12 this mismatch may be compensated for by choosing the cutting locations 52-58 for separating the antenna 12 from a sheet or roll of antenna stock material.

Figure 5:
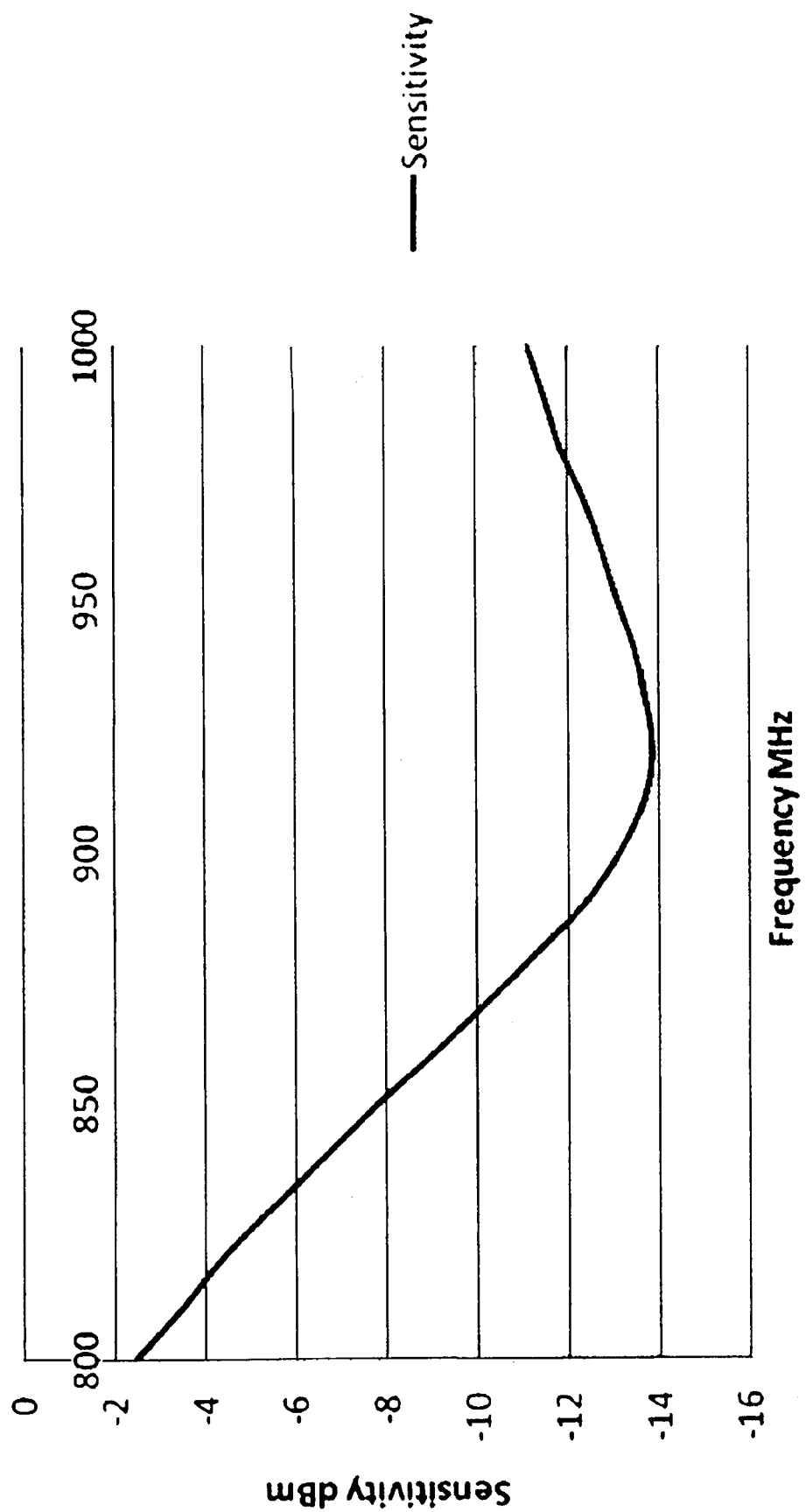
FIG. 5 is a plot showing sensitivity versus frequency for one configuration of antenna produced using a method of an embodiment of the invention.
Figure 6:
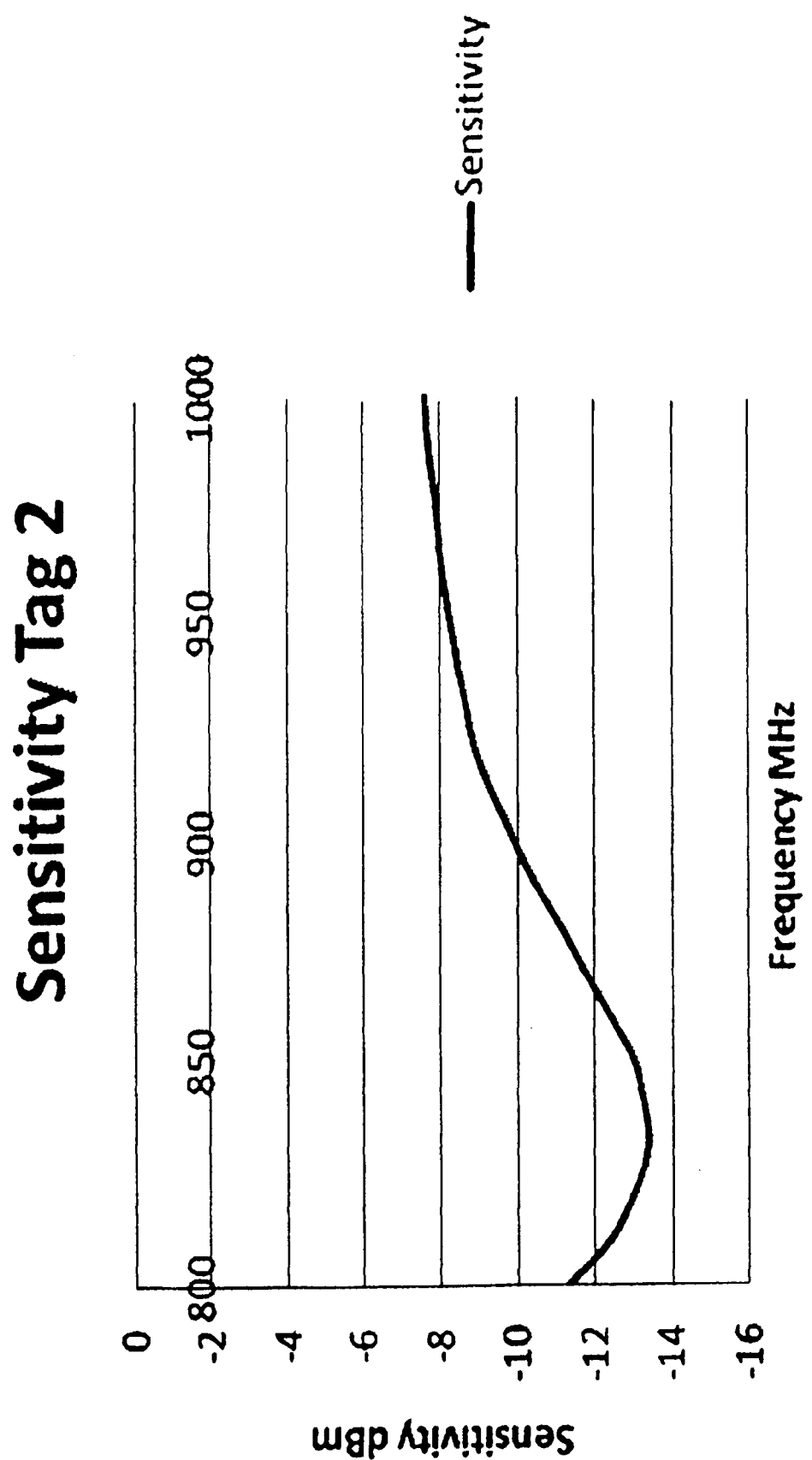
FIG. 6 is a plot showing sensitivity versus frequency for a second configuration of antenna produced using a method of an embodiment of the invention.
Figure 7:
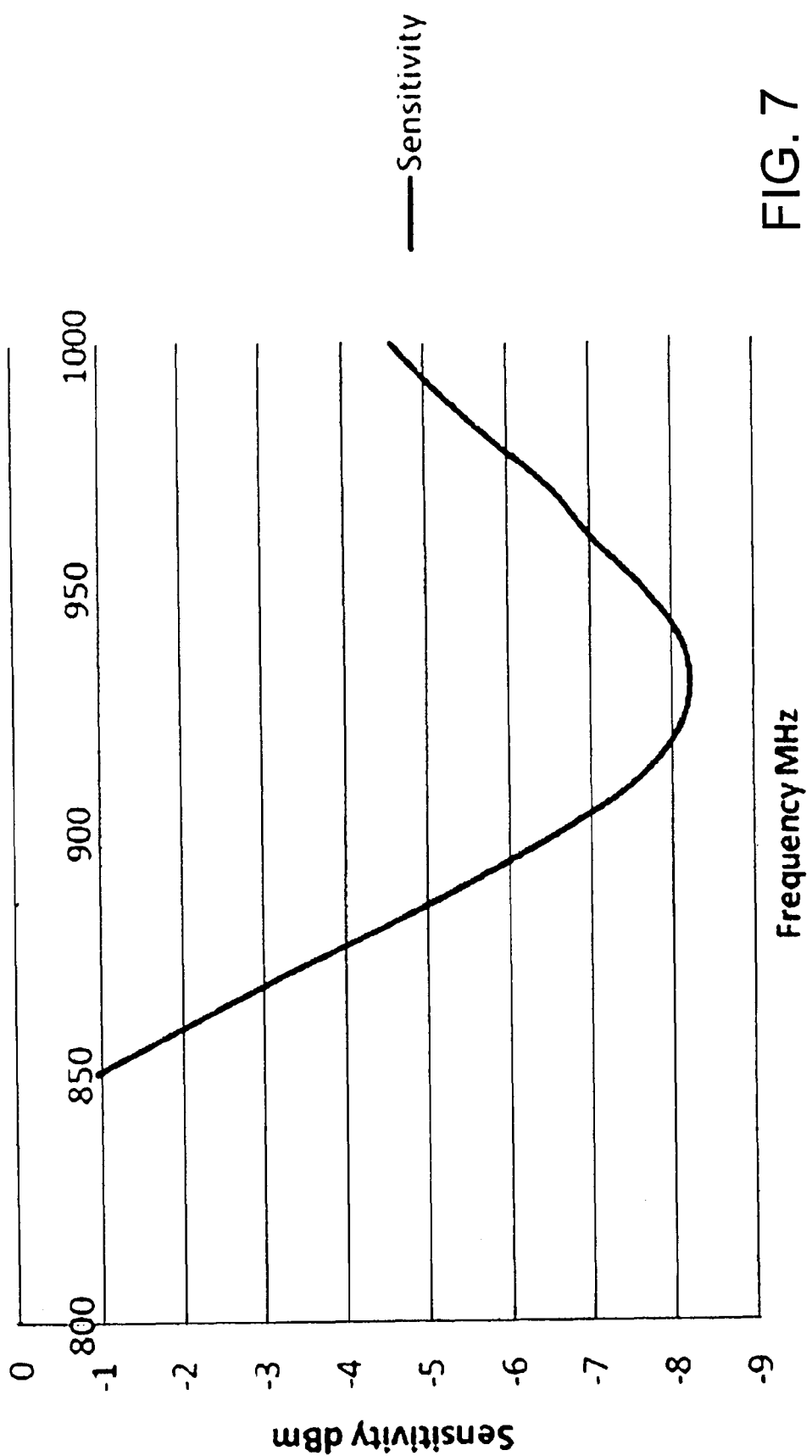
FIG. 7 is a plot showing sensitivity versus frequency for a third configuration of antenna produced using a method of an embodiment of the invention.

A wide variety of antenna characteristics may be obtained from the conductive material sheet 50 merely by changing one or more of the cutting locations 52-58. Sensitivity and bandwidth are among the antenna characteristics that may be altered by selection of and/or movement of the cutting locations 52-58. FIGS. 5-7 show plots of sensitively versus frequency for three example antennas 12, with dimensions around an aperture having the same size and shape. FIG. 5 shows the sensitivity (gain) versus frequency of an antenna with a length X of 102 mm, a width Y of 9 mm, and a shunt inductor width Y1 of 2.5 mm. FIG. 6 shows the sensitivity versus frequency of an antenna with a length X of 96 mm, a width Y of 8.5 mm, and a shunt inductor width Y1 of 1 mm. FIG. 7 shows the sensitivity versus frequency of an antenna with a length X of 60 mm, a width Y of 15 mm, and a shunt inductor width Y1 of 3 mm. As can be seen from these results, it is possible to alter the operating frequency (most sensitive frequency) of an antenna by over 50 MHz merely by changing the cutting locations for forming the antenna from conductive material stock having apertures preformed therein. The bandwidth also varies among the different configurations shown in FIGS. 5-7, with the antenna of FIG. 7 having a smaller bandwidth (range of good sensitivity) than the other two.

Figure 8:
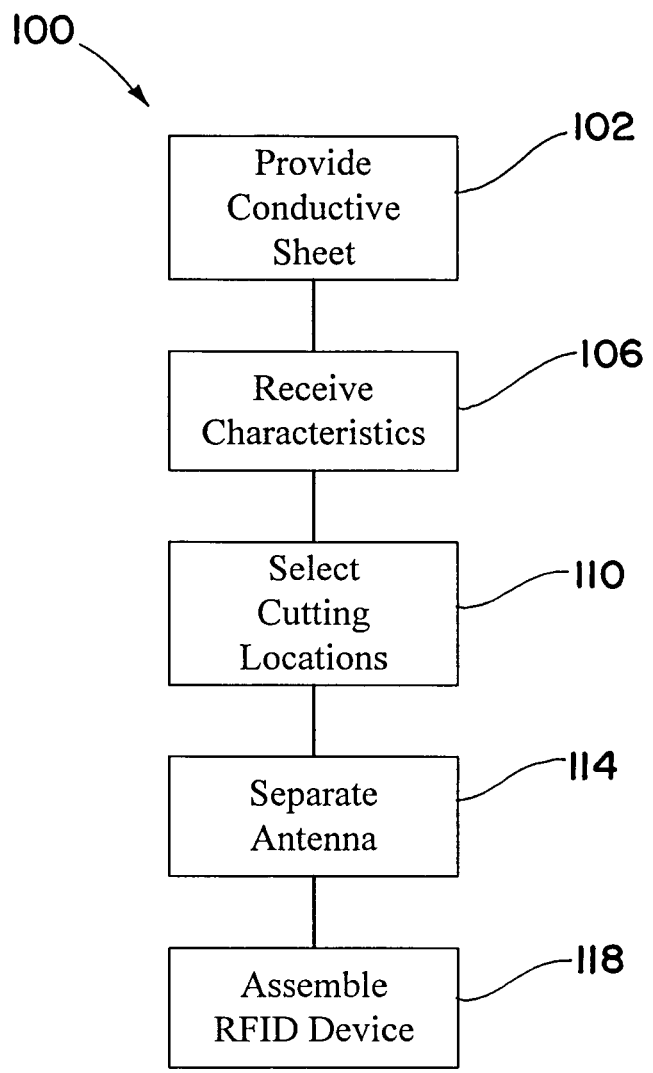
FIG. 8 is a high level flow chart showing steps of a method in accordance with an embodiment of the invention.

FIG. 8 shows a high-level chart of a method 100 for configuring an RFID device 10 (FIG. 1), using an antenna configuration method as described above. In step 102 the conductive material sheet 50 (FIG. 2) is provided, with the apertures 20 (FIG. 2) already formed therein. Since antennas of widely varying characteristics may be produced from the same conductive material sheet 50, by choosing appropriate cutting locations 52-58 (FIG. 3), the conductive material sheet 50 may be produced in bulk, well in advance of when the antennas 12 (FIG. 1) will actually be produced, even before the antenna requirements or desirable characteristics are known. The conductive material sheet 50 may be in the form of a roll material that may be easily stored in compact form, and unrolled when needed, as in for a roll-to-roll production operation.

In step 106 the characteristics for the antenna 12 (FIG. 1) and/or the RFID device 10, or about the environment that the RFID device 10 (FIG. 1) will be used in, are received. The characteristics may include a wide variety factors, including the operating frequency of the antenna 12, the desired bandwidth of the antenna 12, the characteristics of the antenna 12 that would make a good conjugate match with the RFID chip 18, other characteristics of the RFID device 10 that would affect the performance of the antenna 12 (such as the material of the substrate 14 (FIG. 1) and/or other parts of the RFID device 10), and the environment that the RFID device 10 will be used in. The last of these may include the composition of the materials around the RFID device 10, as well the radiation environment encountered by the RFID device 10. The radiation environment may involve any of a variety of frequencies and sources of radiation. The radiation may be involved in communication with other RFID devices, either operating at similar frequencies to those of the RFID device 10, or at different frequencies. Also it will be appreciated that other sorts of devices may introduce radiation in an environment that the RFID device 10 will operate in, and that such radiation may affect operation of the RFID device 10. These effects may be compensated for in whole or in part by proper configuration of the antenna 12, such as by proper selection of the cutting locations 52-58 (FIG. 3).

In step 110 the cutting locations 52-58 (FIG. 3) are selected to realize an antenna 12 (FIG. 3) that is suitable for the situation described by the characteristics received in step 106. The selection of the cutting locations may involve any of a variety of processes, for involving one or more of: use of look-up tables of dimensions and/or shapes to attain certain antenna characteristics and/or features; calculations to determine the cutting locations 52-58, for example using equations relating operating frequency, bandwidth, or other properties to one or more dimensions of the antenna 12 to determine one or more of the cutting locations 52-58; numerical simulations to model behavior of certain antenna configurations under certain conditions to aid in setting one or more of the cutting locations; and testing performance of antenna prototypes, either independently or as part of an RFID device.

In step 114 the antenna 12 (FIG. 1) is physically separated from the conductive material sheet 50 (FIG. 2) at the cutting locations 52-58 (FIG. 3). The physical separating may be performed by any of variety of physical separation methods, including cutting methods such as die cutting, butt cutting, or laser cutting; perforating; slitting; punching; or another suitable physical separation method. The physical separation of the antenna 12 from the conductive material sheet 50 may be part of a roll-to-roll process involving the conductive material sheet 50. The overall shape of the antenna 12 may be rectangular, or may have any of a variety of shapes, such as ovals, circles, or bow-tie-shape structures. Other configurations having decorative, informational, or promotional characteristics, such as a logo, could also be used.

In step 118 the separated antenna 12 is assembled as part of the RFID device 10 (FIG. 1). The coupling together of the antenna 12 with the substrate 14 and the RFID chip 18 (FIG. 1), as well as other parts of the RFID device 10, may be integrated with the physical separation of the antenna 12 from the conductive material sheet 50 (FIG. 2). Alternatively or in addition the coupling of the antenna 12 to other parts of the RFID device 10 may be done in one or more roll-to-roll processes. Roll-to-roll processes have the advantage of being able to efficiently produce RFID devices or parts of RFID devices, such as RFID inlays. Among the parts of the RFID device assembly that may involve one or more roll-to-roll processes are: the physical separation of the antenna 12 from the conductive material sheet (roll) 50; attachment of the antennas 12 to a roll of substrate material for the substrates 14 (FIG. 1); attachment or coupling of RFID chips 18 (or interposers that include RFID chips) to the antennas 12; attachment or formation of other layers of the RFID device 18, such as adhesive layers for RFID labels, printed or printable layers, protective coatings, structural layers, etc.; curing of radiation-activated or thermally-activated adhesives for coupling together parts of the RFID device; and physically separating finished RFID devices or inlays from a web of material, such as a roll of substrate material. Further details regarding some of these roll-to-roll processes may be found in U.S. Pat. No. 6,591,956, which is incorporated herein by reference in its entirety.

The method described above allows for flexibility in configuring antennas 12 for RFID devices 10. By using a single stock of sheet (or roll) conductive material 50, a wide variety of different types of antennas may be produced rapidly and inexpensively. This may make it economical to produce relatively small quantities of RFID devices, because the only operations particular to that small run are the determination of the cutting locations for the antennas, and the setting up of some sort of cutter or other physical separator to effect the physical separation. There is no need for starting a new antenna layout from scratch. The use of a pre-formed stock conductive material sheet 50 may allow converters and other small operations to manufacture by cutting the conductive material sheet 50 using a defined set of rules. This may allow rapid prototyping and evaluation of concepts which would previously not have been economical to address.

It will be appreciated that a wide variety of variations may be employed regarding the above-described antennas and methods. The antenna 12 shown in the figures is rectangular, but it will be appreciated that there may be a different number, shape, and/or orientation of cutting locations, to produce a non-rectangular antenna instead. The number and/or orientation of cutting locations may itself be one factor in configuring the antenna 12 to achieve desirable characteristics.

Similarly, it will be appreciated that the aperture 20 may have a variety of other shapes than the T shape shown in the illustrated embodiment. One consideration is that the aperture shape provide a path in the antenna that will present an effective inductance and tap point to achieve impedance transformation between the antenna portion and the chip strap or interposer. The cut may pass through the aperture, as in the illustrated embodiment, as such a configuration makes the whole structure very efficient in terms of the number of antennas that can be accommodated in a small space. If the aperture was not cut, the total inductance, now represented by two paths, across the chip, would still have to be high enough to work with the chip capacitance, making the structure larger.

Also, it will be appreciated that one or more of the boundaries of the antenna 12 may also be a boundary of the conductive material sheet 50. Thus it is not necessary for the cutting locations 52-58 to fully surround and define the outside border of the antenna 12.

Figure 9:
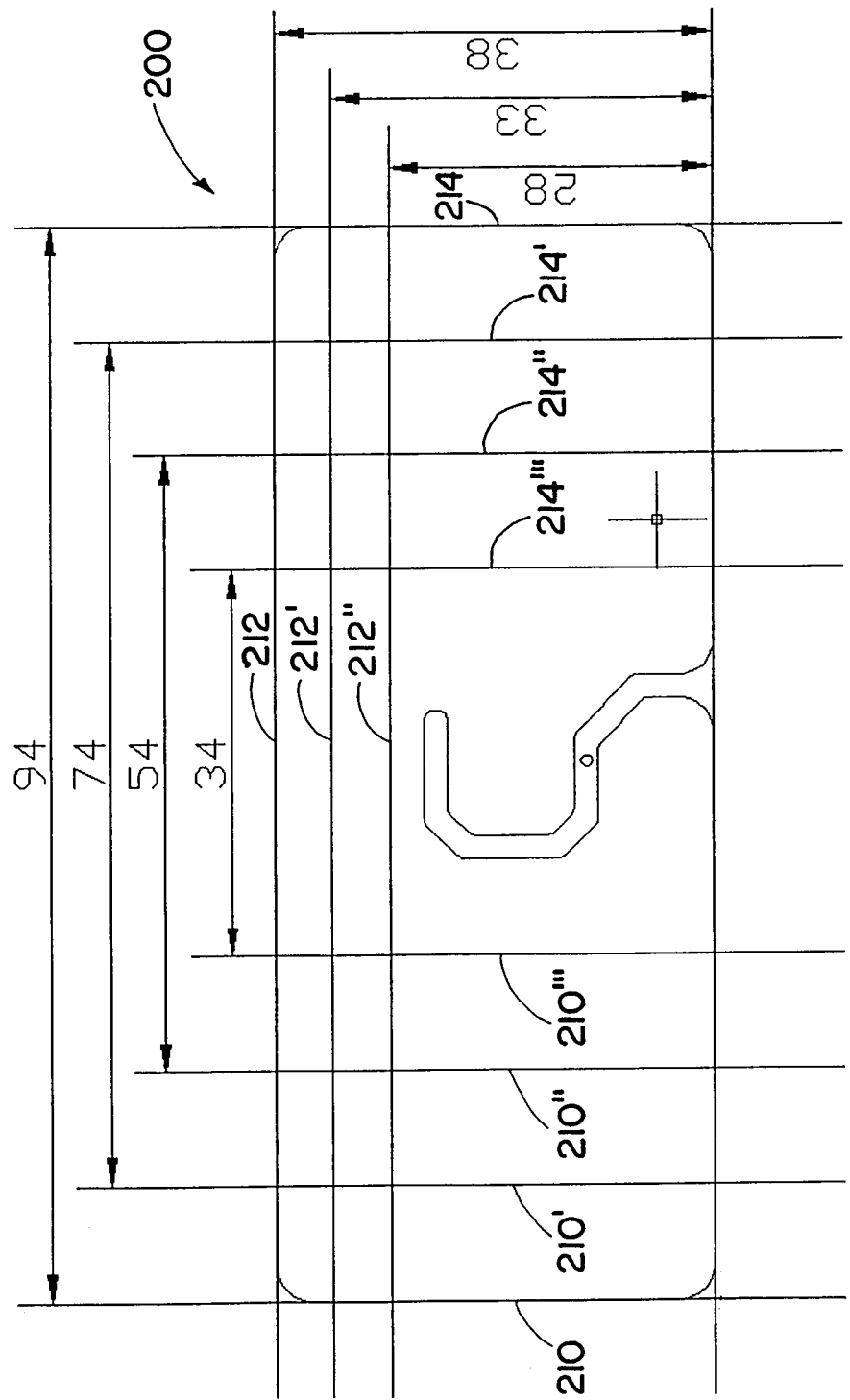
FIG. 9 shows an antenna formed by conductive material separation to any of various sizes.
Figure 10:
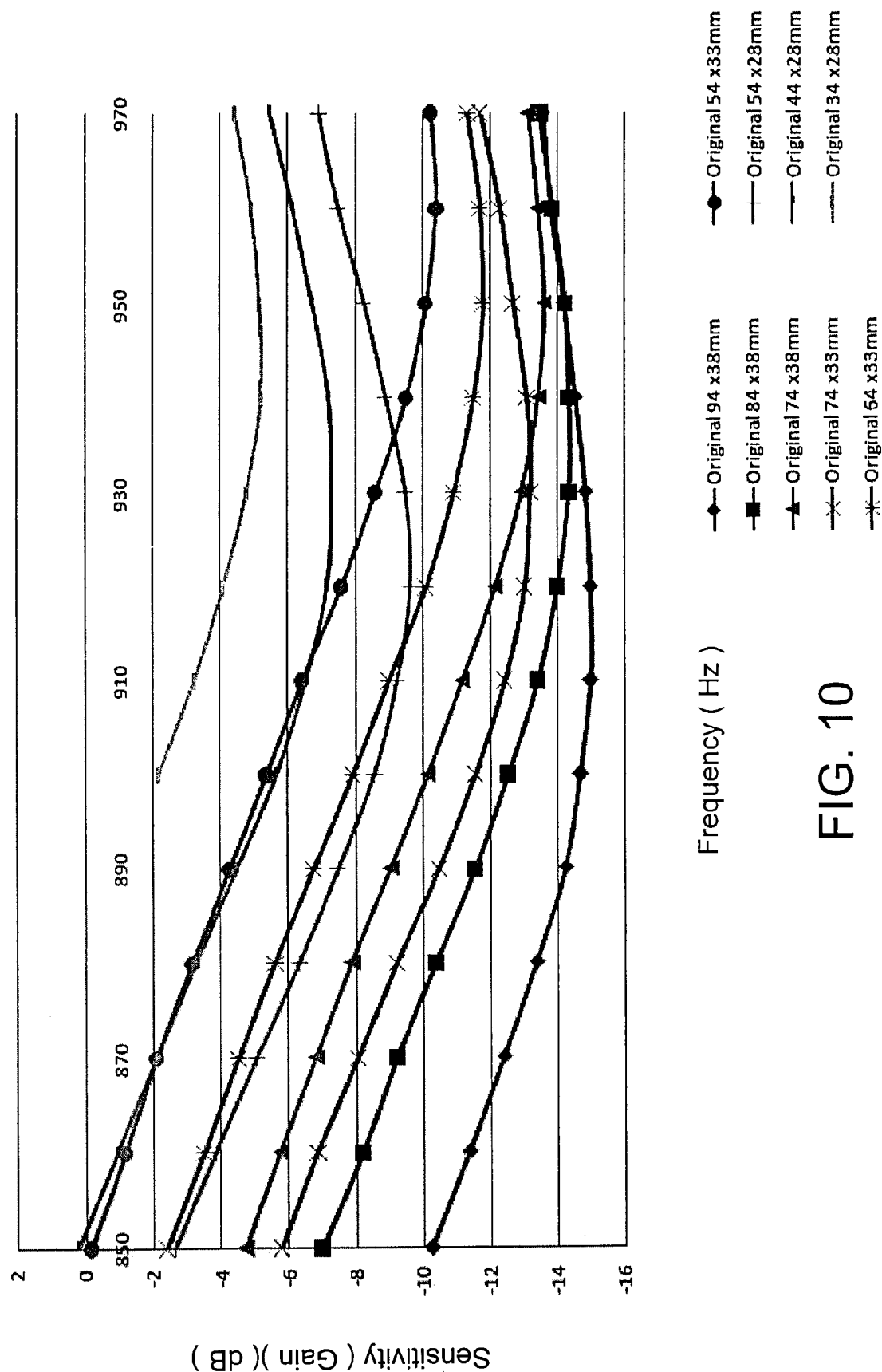
FIG. 10 shows a first plot of gain versus frequency for various antenna configurations shown in FIG. 9.
Figure 11:
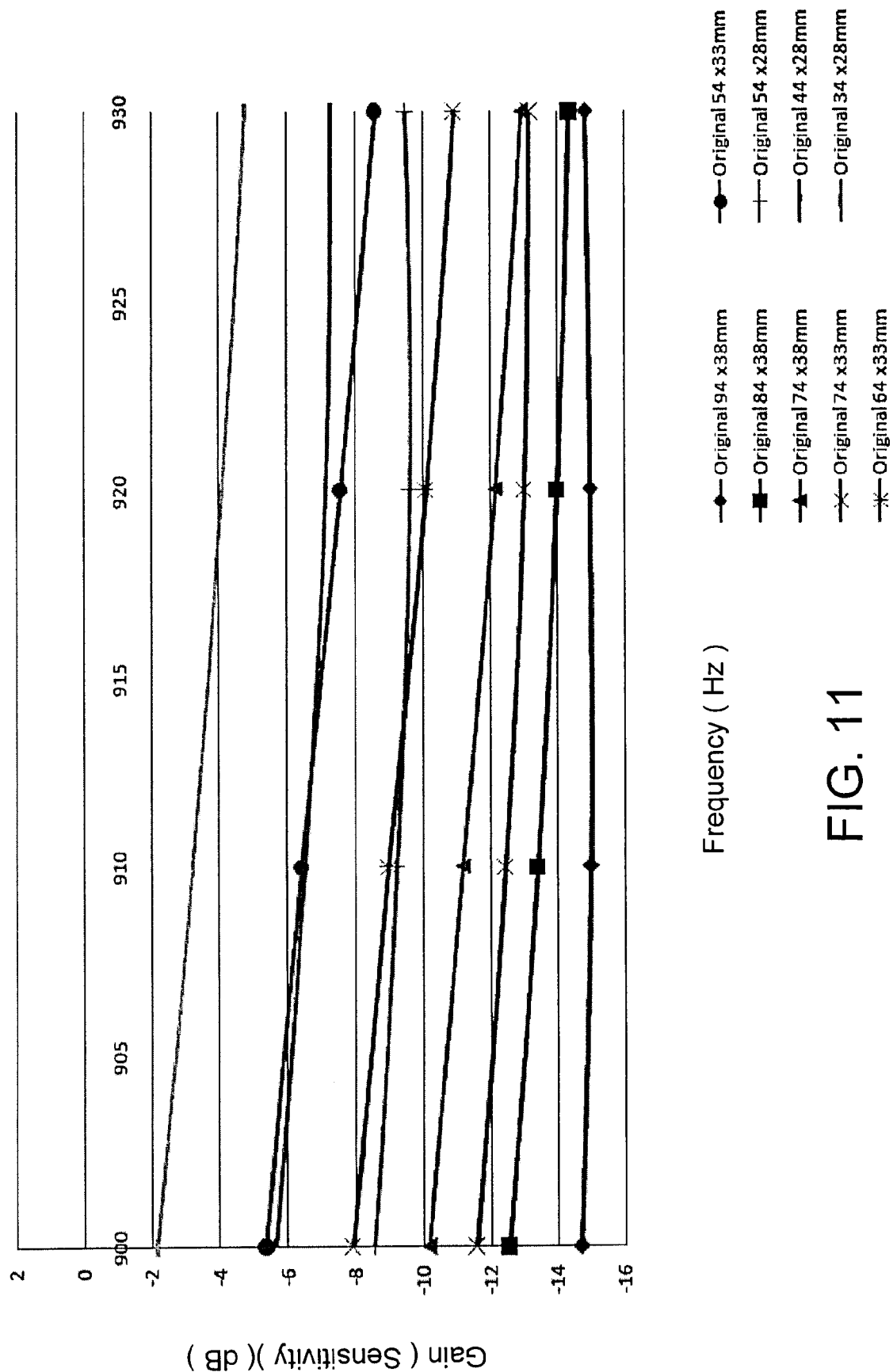
FIG. 11 shows a second plot of gain versus frequency for various antenna configurations shown in FIG. 9.

It will further be appreciated that the antenna 12 may alternatively be a different type of antenna, other than a dipole antenna. The antenna 12 may alternatively be a loop antenna, a slot antenna, or another type of antenna. FIG. 9 shows a slot-loop hybrid (sloop) antenna 200 that has a slot 202, open on one end, that can be cut from a sheet of conductive material at various locations 210, 210', 210'', 210''', 212, 212', 212'', 214, 214', 214'', and/or 214''' to make hybrid slot-loop antennas of various size. Slots 202 may be provided at periodic locations along a sheet or roll of conductive material to form multiple antennas 200 of one or more configurations. FIGS. 10 and 11 show the gain versus frequency for various sloop configurations (formed by cutting, slitting, or otherwise physically separating conductive material to form antennas of given sizes).

Other hybrid slot-loop configurations are shown in U.S. Pat. No. 7,298,330, which is incorporated herein by reference in its entirety. It will be appreciated that the slot configurations shown therein may be used as aperture configurations for a conductive sheet Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of making a radio frequency identification (RFID) device, the method comprising:
   providing a monolithic conductive sheet material having apertures therein;
   after the step of providing, receiving one or more characteristics relating to performance of an antenna for the RFID device, the one or more characteristics including sensitivity, bandwidth and frequency;
   selecting locations to separate the conductive material relative to one of the apertures to form the antenna, wherein the selecting is based on the one or more characteristics relating to performance; and
   separating the conductive sheet material at the selected locations to form the antenna.

2. The method of claim 1, wherein the separating includes cutting the conductive material sheet at the separating locations.

3. The method of claim 1, wherein the physically separating includes slitting the conductive material sheet at the separating locations.

4. The method of claim 1, wherein the conductive sheet material is a roll material; and wherein the physically separating is performed from a roll or a sheet.

5. The method of claim 1, further comprising, after the physically separating, coupling the antenna to other parts of the RFID device.

6. The method of claim 5, wherein the coupling includes connecting an RFID chip to the antenna.

7. The method of claim 6, wherein the connecting is performed with the RFID antenna on a roll or a sheet.

8. The method of claim 1, wherein the apertures in the sheet conductive material are have an extent in a cross-sheet direction greater than an extent of the apertures in down-sheet direction.

9. The method of claim 1, wherein the apertures include T-shape apertures.

10. The method of claim 9, wherein the apertures are substantially uniformly spaced along a direction of the conductive material sheet.

11. The method of claim 1,
wherein the one or more characteristics include a desired operating frequency for the RFID device; and
wherein the selecting includes selecting the separating locations as a function of the desired operating frequency.

12. The method of claim 1,
wherein the one or more characteristics include a desired bandwidth for the RFID device; and
wherein the selecting includes selecting the separating locations as a function of the desired bandwidth.

13. The method of claim 1,
wherein the one or more characteristics include an environment condition that the RFID device is expected to encounter; and
wherein the selecting includes selecting the separating locations as a function of the environment condition.

14. The method of claim 13, wherein the environment condition includes a radiation environment expected to be encountered by the RFID device.

15. The method of claim 13, wherein the environment condition includes a composition of nearby objects expected to be encountered by the RFID device.

16. The method of claim 1, wherein the separating locations define a substantially rectangular antenna.

17. The method of claim 1, wherein the selecting the separating locations includes selecting a separating location that passes through the aperture.

18. The method of claim 17, wherein the other separating locations do not pass through the aperture.

19. The method of claim 1, wherein the conductive sheet material is continuous.

* * * * *